(12) United States Patent
Yang et al.

(10) Patent No.: US 10,122,589 B2
(45) Date of Patent: Nov. 6, 2018

(54) CONFIGURING THE DESIGN OF AN INDUSTRIAL AUTOMATION NETWORK

(71) Applicant: Cisco Technology, Inc., San Jose, CA (US)

(72) Inventors: Xuechen Yang, Austin, TX (US); Rudolph B. Klecka, III, Austin, TX (US); Pascal Thubert, La Colle sur Loup (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 15/094,230

(22) Filed: Apr. 8, 2016

(65) Prior Publication Data
US 2017/0295071 A1    Oct. 12, 2017

(51) Int. Cl.
  *H04L 12/24*   (2006.01)
  *H04L 12/46*   (2006.01)
  *H04L 29/08*   (2006.01)

(52) U.S. Cl.
  CPC ........ *H04L 41/145* (2013.01); *H04L 12/4641* (2013.01); *H04L 41/0893* (2013.01); *H04L 41/12* (2013.01); *H04L 67/12* (2013.01)

(58) Field of Classification Search
  CPC ....... H04L 41/04; H04L 41/085; H04L 41/12; H04L 45/02; H04L 67/12; H04L 12/4641; H04L 41/145; H04L 63/0209; H04L 63/0272; H04W 84/18

USPC ......................................................... 370/254
See application file for complete search history.

(56) References Cited

U.S. PATENT DOCUMENTS

| | | | |
|---|---|---|---|
| 8,179,817 B2* | 5/2012 | Mathiesen | G05B 17/02 370/252 |
| 8,549,347 B1* | 10/2013 | Brandwine | H04L 41/0846 709/224 |
| 9,756,018 B2* | 9/2017 | Doane | H04L 63/0272 |
| 9,819,540 B1* | 11/2017 | Bahadur | H04L 41/0813 |
| 2008/0287058 A1* | 11/2008 | Nahm | G06F 8/65 455/3.02 |
| 2010/0114548 A1* | 5/2010 | Dheenathayalan | G05B 19/4185 703/13 |
| 2010/0274367 A1* | 10/2010 | Kaufman | G05B 17/02 700/31 |
| 2013/0080903 A1* | 3/2013 | Barda | H04L 63/0236 715/736 |
| 2014/0169215 A1* | 6/2014 | Rajendran | H04L 41/0806 370/254 |

(Continued)

*Primary Examiner* — Robert J Lopata
(74) *Attorney, Agent, or Firm* — Parker Ibrahim & Berg LLP; James M. Behmke; Stephen D. LeBarron

(57) ABSTRACT

In one embodiment, a device receives a network policy based upon, at least in part, a physical network, and configures a design of an industrial network overlay on the physical network based upon, at least in part, the network policy. The configuring, according to the techniques herein, may generally include: determining a number of virtual local area networks (VLANs) within the industrial network overlay; determining which devices of the physical network are on which VLAN; determining placement of at least one virtual firewall within the industrial network overlay; and determining at least one communication path for the industrial network overlay between at least two devices.

20 Claims, 5 Drawing Sheets

(56) References Cited

U.S. PATENT DOCUMENTS

| | | | | |
|---|---|---|---|---|
| 2014/0282850 A1* | 9/2014 | Mattes | ................ | H04L 63/0272 |
| | | | | 726/1 |
| 2014/0304403 A1* | 10/2014 | Hadeli | .................. | H04L 41/145 |
| | | | | 709/224 |
| 2014/0321459 A1* | 10/2014 | Kumar | ................ | H04L 47/2425 |
| | | | | 370/360 |
| 2014/0336785 A1* | 11/2014 | Asenjo | ............... | G05B 19/4185 |
| | | | | 700/17 |
| 2014/0336786 A1* | 11/2014 | Asenjo | ............... | G05B 19/4185 |
| | | | | 700/17 |
| 2015/0043378 A1* | 2/2015 | Bardgett | ............. | H04L 12/4641 |
| | | | | 370/254 |
| 2015/0355934 A1* | 12/2015 | Yin | ........................ | H04L 49/70 |
| | | | | 718/1 |
| 2016/0033952 A1* | 2/2016 | Schroeter | ......... | G05B 19/41885 |
| | | | | 700/108 |
| 2016/0036861 A1* | 2/2016 | Mattes | ................ | H04L 63/0272 |
| | | | | 726/1 |
| 2016/0094440 A1* | 3/2016 | Huang | ................... | H04L 45/74 |
| | | | | 370/392 |
| 2016/0119417 A1* | 4/2016 | Fang | ................... | H04L 67/1095 |
| | | | | 709/219 |
| 2016/0134616 A1* | 5/2016 | Koushik | ............. | H04L 63/0807 |
| | | | | 726/9 |
| 2016/0269363 A1* | 9/2016 | Southerland | ......... | G05B 19/054 |
| 2016/0309001 A1* | 10/2016 | Ramachandran | ....... | H04L 67/34 |
| 2016/0366096 A1* | 12/2016 | Gilde | .................... | H04L 63/0281 |
| 2017/0064749 A1* | 3/2017 | Jain | ....................... | H04L 61/256 |
| 2017/0176982 A1* | 6/2017 | Lutz | ................... | G05B 19/4185 |
| 2017/0181210 A1* | 6/2017 | Nadella | ............... | H04W 76/025 |
| 2017/0187679 A1* | 6/2017 | Basak | ................ | H04L 63/0218 |
| 2017/0222873 A1* | 8/2017 | Lee | .................... | H04L 41/0803 |
| 2017/0277171 A1* | 9/2017 | Asenjo | .................. | G06Q 10/06 |
| 2017/0347157 A1* | 11/2017 | Bergstrom | ............ | H04L 47/823 |

* cited by examiner

CONFIGURING THE DESIGN OF AN INDUSTRIAL AUTOMATION NETWORK

TECHNICAL FIELD

The present disclosure relates generally to computer networks, and, more particularly, to configuring the design of an industrial automation network.

BACKGROUND

Many network communication protocols have been defined over the years based on particular situations, such as for large-scale networks, wireless networks, low-power and lossy networks (LLNs), and, in particular, industrial automation. For instance, an industrial automation network generally has very different characteristics than a typical internet technology network. A typical industrial network is set up and configured as previously drawn on a computer-aided design (CAD) drawing, where once the network is up and running, it generally never changes. That is, capturing a picture of the traffic at any point of the network, one would observe the same traffic pattern with very little variation day after day, year after year. In other words, in a typical industrial automation network, which is designed for communication between machines, not humans, the network structure is rigid, and the traffic pattern is predictable.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives a network policy based upon, at least in part, a physical network, and configures a design of an industrial network overlay on the physical network based upon, at least in part, the network policy. The configuring, according to the techniques herein, may generally include: determining a number of virtual local area networks (VLANs) within the industrial network overlay; determining which devices of the physical network are on which VLAN; determining placement of at least one virtual firewall within the industrial network overlay; and determining at least one communication path for the industrial network overlay between at least two devices.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication (PLC) networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
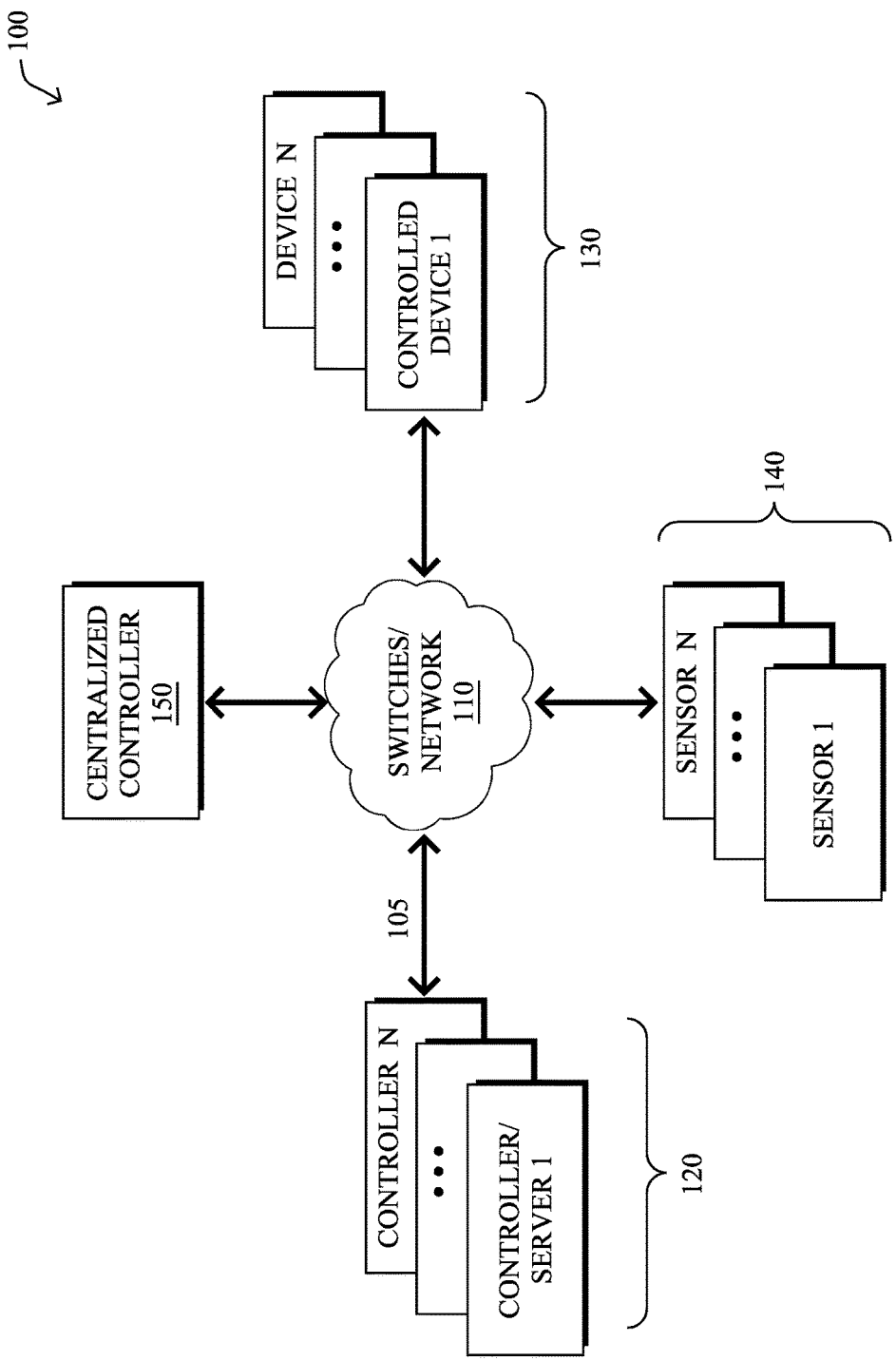
FIG. 1 illustrates an example communication network.

FIG. 1 is a schematic block diagram of a simplified example computer system 100 illustratively comprising links 105 interconnecting one or more devices through a network of routers or switches 110. For example, a set of one or more controllers (or servers) 120 may be interconnected with a set of one or more controlled devices 130 and one or more sensors 140, such as part of an industrial network. In addition, centralized controller 150 (generally, a device, herein) may be in communication with the devices of the network 100 as well.

The devices, generally, may be interconnected by various methods of communication. For instance, the links 105 may be wired links or shared media (e.g., wireless links, PLC links, etc.) where certain devices may be in communication with other devices, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, system 100 is merely an example illustration that is not meant to limit the disclosure.

Data packets (e.g., traffic and/or messages sent between the devices/nodes) may be exchanged among the nodes/devices of the computer system 100 using predefined network communication protocols such as certain known wired protocols, shared-media protocols (e.g., wireless protocols, PLC protocols, etc.), or other protocols where appropriate. In this context, a protocol consists of a set of rules defining how the nodes interact with each other.

According to various embodiments, network 100 may be, or may include, an "Internet of Things" or "IoT" network. In particular, many IoT networks are Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Industrial automation deals primarily with the automation of manufacturing, quality control and material handling processes. Industrial automation networks, in particular, are generally concerned with no-loss on-time delivery of sensed data and/or actuator instructions. As such, many protocols have been developed for the deterministic delivery of transmitted data. Industrial automation networks must also interoperate with both current and legacy systems, and must provide predictable performance and maintainability, and should provide security both from intrusions from outside the plant, and from inadvertent or unauthorized use within the plant.

Figure 2:
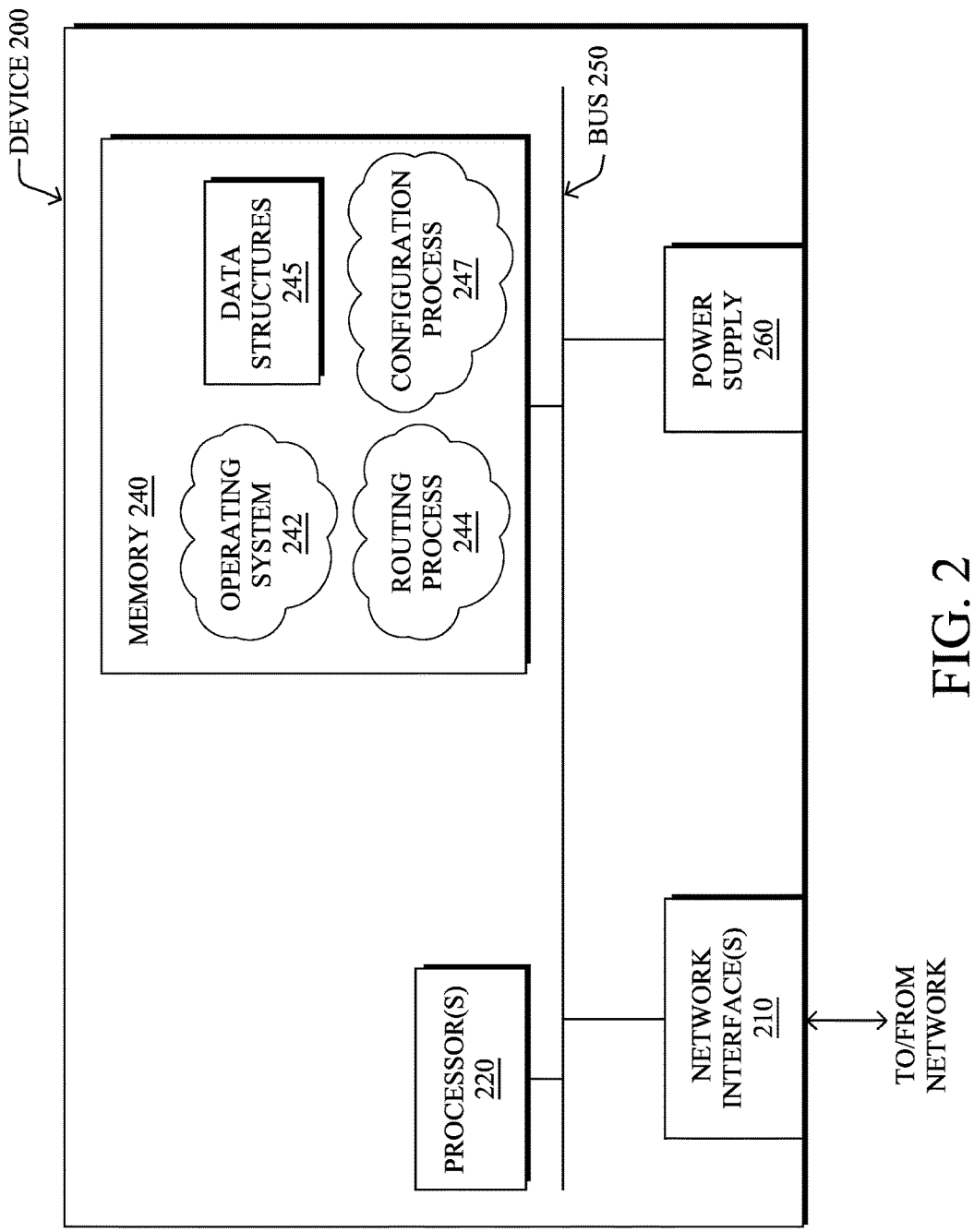
FIG. 2 illustrates an example network device/node.

FIG. 2 is a schematic block diagram of an example node/device 200 that may be used with one or more embodiments described herein, e.g., as any of the nodes/devices shown in FIG. 1 above, particularly as the centralized controller 150 as described herein. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise a routing process 244, and an illustrative configuration process 247, as described herein. Note that while routing process 244 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. As noted above, industrial automation networks are generally deterministic networks, providing predictable performance and maintainability, and as such are generally proactively configured/routed.

Figure 3:
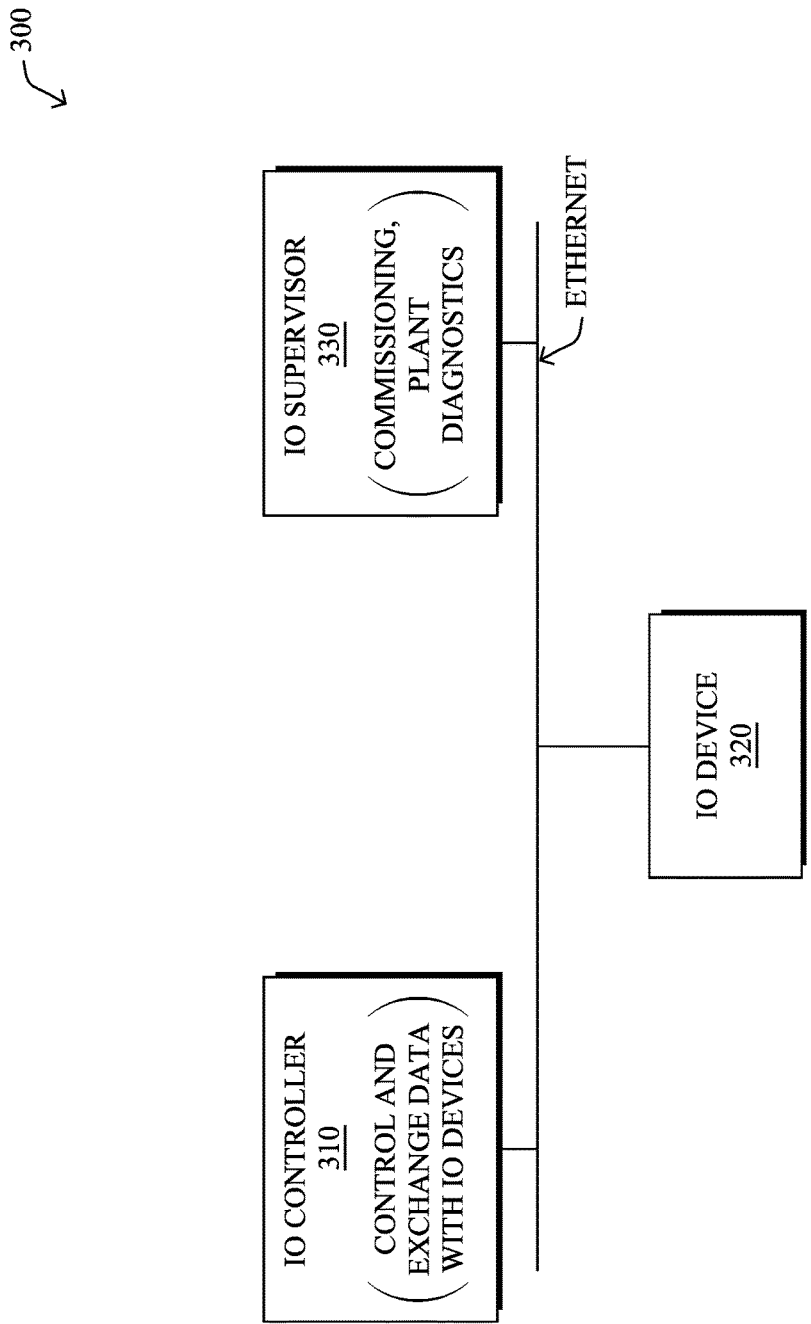
FIG. 3 illustrates an example view of the communication network as an example industrial automation network.

As shown in FIG. 3, a typical system components of an industrial I/O (or simply "IO") system 300 (a specific implementation/component of network 100) consists of three components:

IO Controller 310—Controls the automation task;
    IO device 320—field device monitored and controlled by
        IO controller (may consist of a several modules and sub-modules); and IO Supervisor 330—Software on device/PC to set parameters and diagnose individual IO devices.

In an example industrial network, an Application Relation (AR) is established between an IO Controller and an IO Device. These ARs are used to define Communication Relations (CR) with different characteristics for the transfer of parameters, cyclic exchange of data and handling of alarms. Also, each device/module within an industrial automation network has three addresses: MAC address, IP address, and device name (a logical name for the module within the total configuration). Generally, for allocation of the IP address, subnet mask, and default gateway two methods are defined: Discovery and Configuration Protocol (DCP); and Dynamic Host Configuration Protocol (DHCP).

As noted above, an industrial automation network generally has very different characteristics than a typical internet technology network, and is often set up as configured in advance, remaining unchanged thereafter. Although industrial networks have been implemented for many years, there are still inefficiencies with the design of an industrial automation network, such as the ability to derive full knowledge of the network setup, the traffic model, and operation from Control Data Configuration and Control Logic, which is the same logic that is written into Automation Controllers (e.g., programmable logic controllers (PLCs), programmable automation controllers (PACs), remote terminal units (RTUs), etc.).

Configuring the Design of an Industrial Automation Network

Combined with the ability of understanding network topology and individual device capability, the system herein can automate network setup and configuration, and ultimately ensure the automation process and operation being carried out safely and securely as designed.

Generally, there are two important inputs to the proposed system: Tag Configuration and Control Program Logic. "Tag Configuration" contains the input and output I/O data set of the control systems, including the tag name, tag producer (e.g., an I/O block), tag consumer(s) (e.g. a PLC), location of the device producing the tag (e.g., MAC and IP address), tag type, and tag value properties (e.g., range, data type, etc.). In most automation systems, device capability and mapping (e.g., an Electronic Data Sheet (EDS) in the Common Industrial Protocol (CIP) and EtherNet/IP ecosystem) may also be included as part of the Tag Configuration input.

As an example, a tag is industrial automation data generated or requested by a certain device, such as a temperature sensor measuring the environment (an output tag) or a cooling device requesting the temperature (an input tag). That is, an example temperature output tag may comprise a temperature sensor address, and optionally a list of who needs to access the data (e.g., the cooling device). On the other hand, a temperature input tag may comprise a cooling device address, whether the data is to be polled or pushed, at what interval, etc. Additionally, a tag can be networked (e.g., transferred on an IP network as a packet) or transmitted via a direct port connection.

"Control Program Logic", on the other hand, refers to the control programs written into industrial controllers to perform different operations. Such logic used to be programmed using a language called RLL (Relay Ladder Logic) or just LL (Ladder Logic). As microprocessors have become more powerful, notations such as sequential function charts and function block diagrams can replace ladder logic for some limited applications. Modern PLCs can now be programmed using programming language that resembles BASIC or C or other programming language with bindings appropriate for a real-time application environment. For example, IEC 61131-3:2013 specifies the syntax and semantics of a unified suite of programming languages for programmable controllers (PCs). This suite consists of two textual languages, Instruction List (IL) and Structured Text (ST), and two graphical languages, Ladder Diagram (LD) and Function Block Diagram (FBD).

As an example, access to the data (defined in the tags) can be based on control logic, such as Boolean logic, cause/effect, and so on. For instance, an input tag-based control logic may be something like "IF temp>X", where the output tag-based control logic may respond "THEN increase cooling". For the greatest efficiency, each industrial network thus needs to be specifically mapped to "connect the dots" of the particular industrial network's operation (e.g., "every ten seconds, transmit two bytes of temperature from this device to that device, and in response to temp>X, increase cooling", and so on).

Due to the complexity of the overall system, and the fact that different algorithms and rule engines needed to derive network segmentation, network traffic model, and security policy configuration, there are many aspects that are important to the proper design and implementation of an industrial automation network.

The techniques herein, in particular, are able to use tag configuration (e.g., alone) to auto-determine the network topology, hierarchy, and segmentation of an industrial automation network, such as for virtual local area networks (VLANs), number of switches, how switches and nodes are connected, overlays, and so on. That is, customers can benefit greatly from the techniques herein if they don't already have a network, and want to auto-design and build an optimal network based on their planned industrial operation. In other words, the proposed mechanism streamlines the network design from the control logic and I/O configuration governing the underlying industrial operation.

Specifically, according to one or more embodiments of the disclosure as described in detail below, a device receives a network policy based upon, at least in part, a physical network, and configures a design of an industrial network overlay on the physical network based upon, at least in part, the network policy. The configuring, according to the techniques herein, may generally include: determining a number of virtual local area networks (VLANs) within the industrial network overlay; determining which devices of the physical network are on which VLAN; determining placement of at least one virtual firewall within the industrial network overlay; and determining at least one communication path for the industrial network overlay between at least two devices.

Illustratively, the techniques described herein may be performed by hardware, software, and/or firmware, such as in accordance with the configuration process 247, which may contain computer executable instructions executed by the processor 220 to perform functions relating to the techniques described herein, e.g., in conjunction with other suitable processes (e.g., as inputs and/or outputs to the configuration process 247, accordingly).

Operationally, the techniques herein assume a fully connected physical network, where there is physical connectivity between devices or machines plugged into the network. From this assumption, the techniques herein allow for automatically configuring virtual network overlays and functions, including:

Determining a number of VLANs, and which devices are on which VLANs;

Determining the placement of virtual Firewalls and policies; and

Determining the communication path between any two devices.

The inputs to the proposed system are the complete set of Tag Configurations (a Tag represents an I/O value produced/consumed by industrial machines) and device capability mappings (which can be exported as part of the Tag Configuration).

According to the techniques herein, in order to translate such inputs into a high-level network design, one or more of the following design rules may be illustratively adopted:

1. If a controller outputs to an I/O block as the owner, they must be on the same VLAN;
2. Two controllers must be on separate VLANs if there is no overlap between I/O modules owned by each controller and Tags consumed by each controller;
3. If a controller consumes a Base Tag produced by an I/O device as the one and only owner, they must be on the same VLAN;
4. If a controller consumes a Base Tag produced by an I/O device as one of the owners, and the I/O value is not buffered, they must on the same VLAN (note that this means multiple controller and associated owner I/O modules are all on the same VLAN);
5. If a controller consumes a Base Tag produced by an I/O device as one of the owners, but the I/O value is buffered, they can be on the same or different VLAN; and/or
6. A Firewall must be created for each controller with a policy that only allows the data flow between the controller and associated I/O devices (and other controllers if any).

Figure 4:
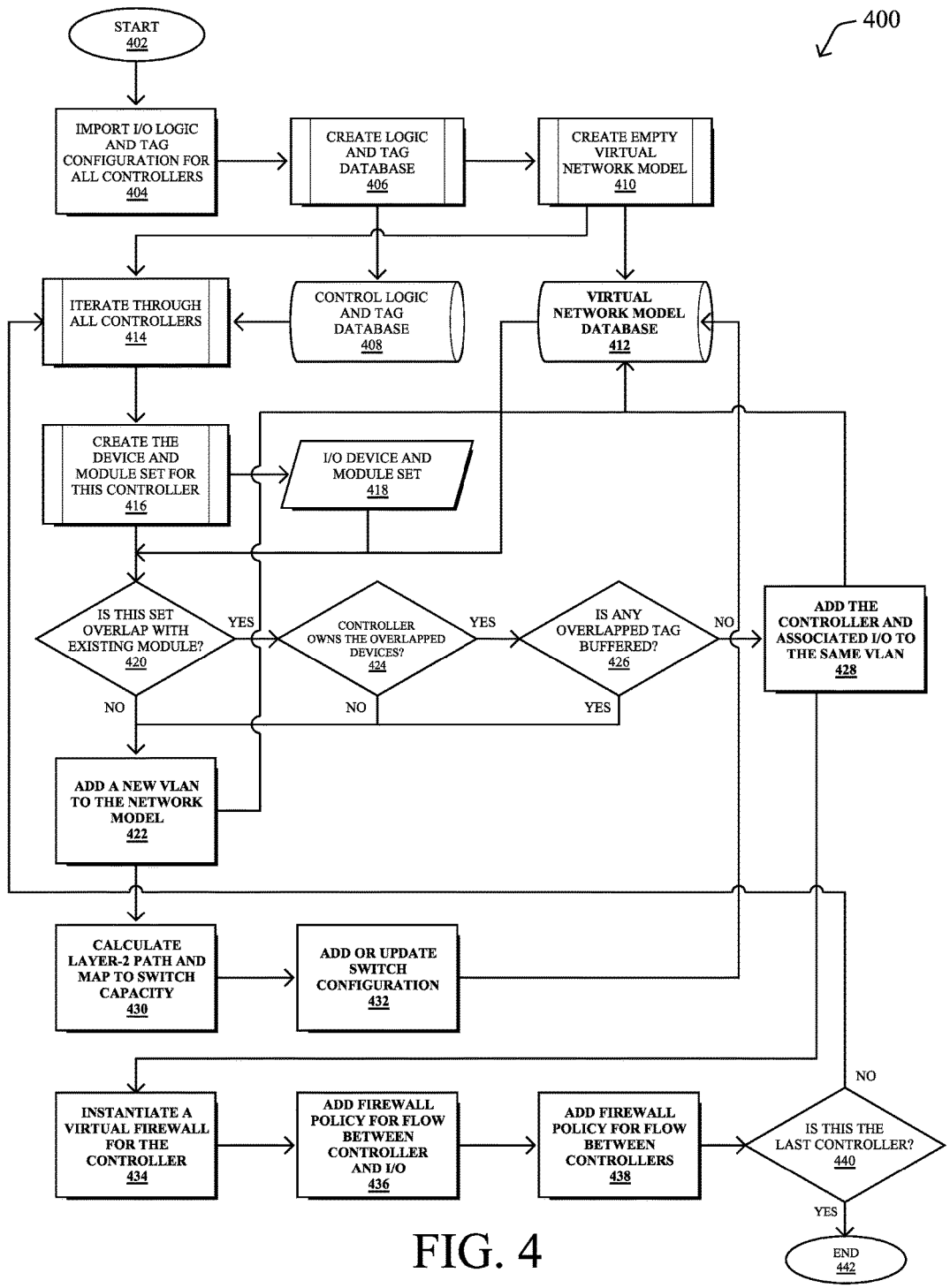
FIG. 4 illustrates an example simplified procedure for configuring the design of an industrial automation network, particularly for mapping tags and I/O module configuration to network design.

With these rules in place (e.g., illustratively abiding by these rules), FIG. 4 illustrates an example simplified procedure for configuring the design of an industrial automation network in accordance with one or more embodiments described herein, particularly for mapping tags and I/O module configuration to network design. The procedure 400 may start at step 402, and continues to step 404, where I/O logic and tag configuration (I/O tag configurations and EDS and device capability mappings) are imported for all controllers of the network. In step 406, the system creates a control logic and tag database (item 408), and in step 410 creates an empty virtual network model (database 412). The empty virtual network model database 412 (in its initial state) and the control logic and tag database 408 are then used as inputs for the iterations (starting at step 414) through all of the controllers in the system.

For each controller, then, in step 416 the system creates the device and module set 418 for this controller, which is then compared to the existing virtual network model database 412 to determine in step 420 whether this set (418) overlaps with the existing model (412). If not, then in step 422 a new VLAN is added to the network model 412. A new VLAN is also added if there is overlap in step 420, but the controller does not own the overlapped device(s) in step 424. Moreover, if the controller does own the overlapped device(s) in step 424, but any of the overlapped tags are buffered in step 426, then the new VLAN is still added in step 422. However, if none of the overlapped tags are buffered in step 426 (and the controller owns the overlapped device(s) in step 424), then the controller and the associated I/O are added to the same VLAN in step 428, and the virtual network model 412 is updated accordingly.

Notably, when a new VLAN is added to the network model, then in step 430 a layer-2 path is calculated and mapped to the switch capacity of the network. As such, in step 432, switches may either be added or simply updated in the switch configuration of the network model 412.

In one embodiment, based on the switch configurations and VLAN configurations, a virtual firewall for the controller may be instantiated in step 434 (e.g., a per-port virtual firewall), and the firewall policy may be added for flow between the controller and the I/O in step 436. Additionally, in step 438, a firewall policy may be added for flow between controllers as well.

If this controller is the last controller in step 440, the procedure 400 ends in step 442. However, if there are more controllers to iterate through, then the procedure returns to step 414 to proceed to the next controller, accordingly. Once there are no further controllers for iteration, the virtual network model 412 will be complete and ready for implantation and configuration.

Figure 5:
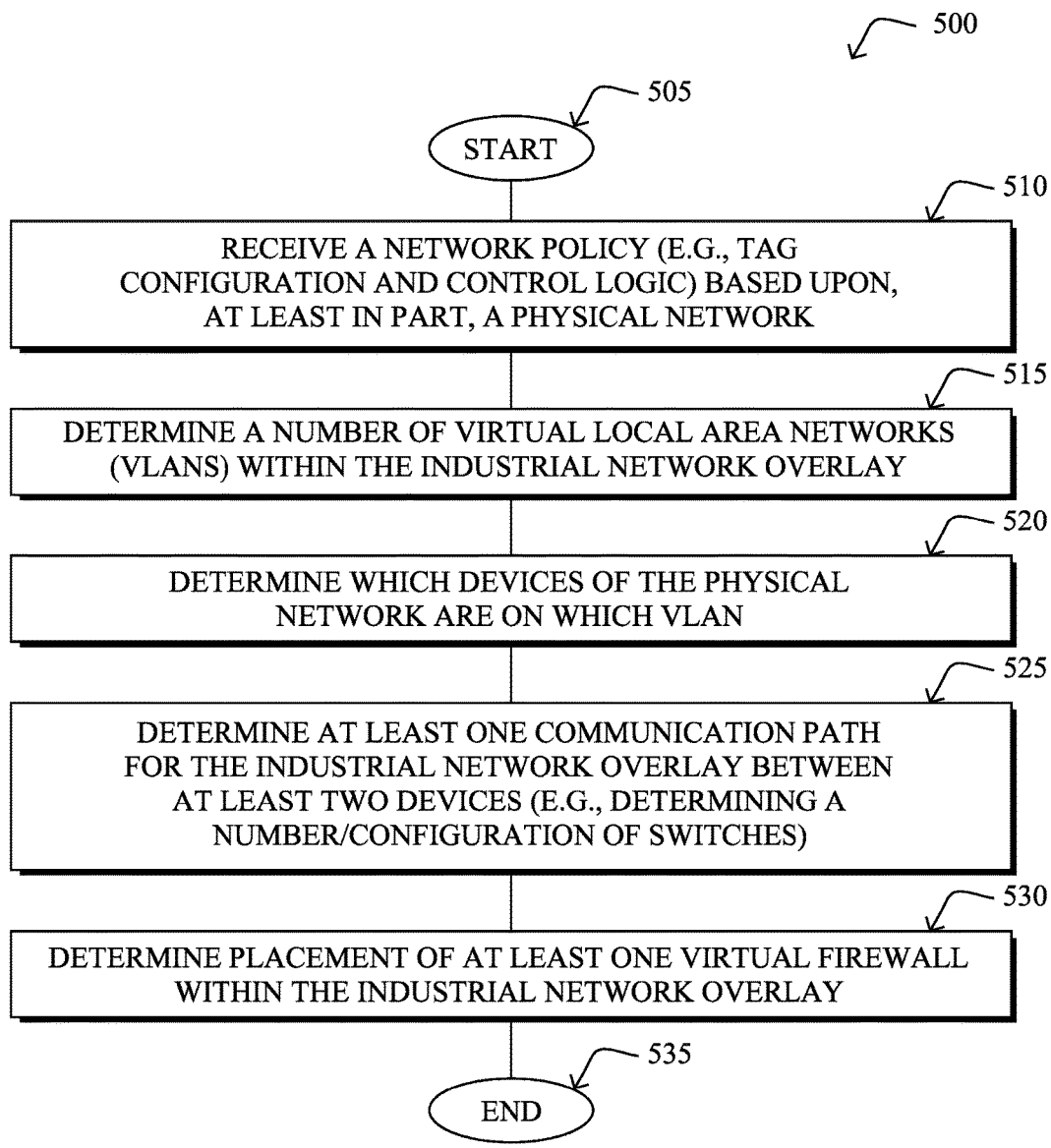
FIG. 5 illustrates another example simplified procedure for configuring the design of an industrial automation network.

As a further (and more general) example of the techniques herein, FIG. 5 illustrates an example simplified procedure for configuring the design of an industrial automation network in accordance with one or more embodiments described herein. The procedure 500 may start at step 505, and continues to step 510, where, as described in greater detail above, a device (e.g., a centralized controller) receives a network policy based upon, at least in part, a physical network. That network policy, in particular, may comprise the tag configuration data from each device included within the industrial network overlay as well as the associated control logic, as described above. From this accumulated information, the procedure 500 may then proceed to configure a design of an industrial network overlay on the physical network based upon, at least in part, the network policy and one or more of the design rules mentioned above.

Specifically, and in no particular order, in step 515, a number of VLANs may be determined within the industrial network overlay, where in step 520 it is also determined which devices of the physical network are on which VLAN (e.g., adding certain controllers and associated devices to a particular VLAN within the industrial network overlay). Also, in step 525, at least one communication path for the industrial network overlay may be determined between at least two devices, which may assist in determining a number of switches to include within the industrial network overlay. Moreover, in step 530, placement of at least one virtual firewall within the industrial network overlay may be determined (e.g., where a firewall policy is derived for flow between controllers of different VLANs within the industrial network overlay).

The illustrative simplified procedure 500 may then end in step 535, notably resulting in the completed virtual network model 412 as described in greater detail above.

It should be noted that while certain steps within procedures 400-500 may be optional as described above, the steps shown in FIGS. 4-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The techniques described herein, therefore, provide for configuring the design of an industrial automation network. In particular, the techniques herein greatly simplify the setup and configuration of an Industrial Automation Network, and enables network function virtualization (NFV) creation by deriving the requirements from control logic.

While there have been shown and described illustrative embodiments that provide for configuring the design of an industrial automation network, it is to be understood that various other adaptations and modifications may be made within the spirit and scope of the embodiments herein. For example, the embodiments have been shown and described herein with relation specifically to industrial networks. However, the embodiments in their broader sense are not as limited, and may, in fact, be used with other types of networks that may also benefit from the techniques herein, such as those with similar traffic requirements, traffic patterns, security considerations, etc. In addition, while certain protocols may have been mentioned and/or shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device, a network policy based upon, at least in part, a physical network; and
   automatically configuring, by the device, a design of an industrial network overlay on the physical network based upon, at least in part, the network policy, the configuring including:
      determining, by the device, a number of virtual local area networks (VLANs) within the industrial network overlay;
      identifying, by the device, which devices of the physical network are on which VLAN;
      determining, by the device, placement of at least one virtual firewall within the industrial network overlay;
      determining, by the device, at least one communication path for the industrial network overlay between at least two devices; and
      automatically setting up, by the device, the industrial network overlay based on the configuration.

2. The method as in claim 1, wherein receiving the network policy comprises:
   receiving tag configuration data from each device included within the industrial network overlay.

3. The method as in claim 1, further comprising:
   determining a number of switches to include within the industrial network overlay.

4. The method as in claim 1, further comprising:
   adding a controller and associated devices to the VLAN within the industrial network overlay.

5. The method as in claim 1, further comprising:
   deriving a firewall policy for flow between controllers of different VLANs within the industrial network overlay.

6. The method as in claim 1, wherein configuring the design of an industrial network overlay comprises:
   abiding by a rule that if a controller outputs to an I/O block as the owner, the controller and the I/O block must be on the same VLAN.

7. The method as in claim 1, wherein configuring the design of an industrial network overlay comprises:
   abiding by a rule that two controllers must be on separate VLANs if there is no overlap between I/O modules owned by each controller and tags consumed by each controller.

8. The method as in claim 1, wherein configuring the design of an industrial network overlay comprises:
   abiding by a rule that if a controller consumes a Base Tag produced by an I/O device as the one and only owner, the controller and the I/O device must be on the same VLAN.

9. The method as in claim 1, wherein configuring the design of an industrial network overlay comprises:
   abiding by a rule that if a controller consumes a Base Tag produced by an I/O device as one of the owners, and an I/O value from the I/O device is not buffered, the controller and the I/O device must on the same VLAN.

10. The method as in claim 1, wherein configuring the design of an industrial network overlay comprises:
    abiding by a rule that if a controller consumes a Base Tag produced by an I/O device as one of the owners, but an I/O value from the I/O device is buffered, the controller and the I/O device can be on the same VLAN or a different VLAN.

11. The method as in claim 1, wherein configuring the design of an industrial network overlay comprises:
    abiding by a rule that a firewall must be created for each controller with a policy that only allows data flow between a given controller and associated I/O devices.

12. An apparatus, comprising:
    one or more network interfaces;
    a processor coupled to the network interfaces and adapted to execute one or more processes; and
    a memory configured to store a process executable by the processor, the process when executed operable to:
       receive a network policy based upon, at least in part, a physical network; and
       automatically configure a design of an industrial network overlay on the physical network based upon, at least in part, the network policy, the configuring including:
          determining a number of virtual local area networks (VLANs) within the industrial network overlay;
          identify which devices of the physical network are on which VLAN;
          determining placement of at least one virtual firewall within the industrial network overlay;
          determining at least one communication path for the industrial network overlay between at least two devices; and
          automatically setup the industrial network overlay based on the configuration.

13. The apparatus as in claim 12, wherein the process when executed to receive the network policy is further operable to:
    receive tag configuration data from each device included within the industrial network overlay.

14. The apparatus as in claim 12, wherein the process when executed is further operable to:
    determine a number of switches to include within the industrial network overlay.

15. The apparatus as in claim 12, wherein the process when executed is further operable to:

add a controller and associated devices to a particular VLAN within the industrial network overlay.

16. The apparatus as in claim 12, wherein the process when executed is further operable to:
    derive a firewall policy for flow between controllers of different VLANs within the industrial network overlay.

17. The apparatus as in claim 12, wherein the process when executed to configure the design of an industrial network overlay is further operable to abide by one or more rules selected from a group consisting of:
    if a controller outputs to an I/O block as the owner, the controller and the I/O block must be on the same VLAN;
    two controllers must be on separate VLANs if there is no overlap between I/O modules owned by each controller and tags consumed by each controller;
    if a controller consumes a Base Tag produced by an I/O device as the one and only owner, the controller and the I/O device must be on the same VLAN;
    if a controller consumes a Base Tag produced by an I/O device as one of the owners, and an I/O value from the I/O device is not buffered, the controller and the I/O device must on the same VLAN;
    if a controller consumes a Base Tag produced by an I/O device as one of the owners, but an I/O value from the I/O device is buffered, the controller and the I/O device can be on the same VLAN or a different VLAN; and
    a firewall must be created for each controller with a policy that only allows data flow between a given controller and associated I/O devices.

18. A tangible, non-transitory, computer-readable media having software encoded thereon, the software when executed by a processor operable to:
    receive a network policy based upon, at least in part, a physical network; and
    automatically configure a design of an industrial network overlay on the physical network based upon, at least in part, the network policy, the configuring including:
        determining a number of virtual local area networks (VLANs) within the industrial network overlay;
        identifying which devices of the physical network are on which VLAN;
        determining placement of at least one virtual firewall within the industrial network overlay; and
        determining at least one communication path for the industrial network overlay between at least two devices; and
        automatically setting up the industrial network overlay based on the configuration.

19. The computer-readable media as in claim 18, wherein the software when executed to receive the network policy is further operable to:
    receive tag configuration data from each device included within the industrial network overlay.

20. The computer-readable media as in claim 18, wherein the process when executed to configure the design of an industrial network overlay is further operable to abide by one or more rules selected from a group consisting of:
    if a controller outputs to an I/O block as the owner, the controller and the I/O block must be on the same VLAN;
    two controllers must be on separate VLANs if there is no overlap between I/O modules owned by each controller and tags consumed by each controller;
    if a controller consumes a Base Tag produced by an I/O device as the one and only owner, the controller and the I/O device must be on the same VLAN;
    if a controller consumes a Base Tag produced by an I/O device as one of the owners, and an I/O value from the I/O device is not buffered, the controller and the I/O device must on the same VLAN;
    if a controller consumes a Base Tag produced by an I/O device as one of the owners, but an I/O value from the I/O device is buffered, the controller and the I/O device can be on the same VLAN or a different VLAN; and
    a firewall must be created for each controller with a policy that only allows data flow between a given controller and associated I/O devices.

* * * * *